United States Patent
Hatfield et al.

(10) Patent No.: US 7,017,407 B1
(45) Date of Patent: *Mar. 28, 2006

(54) APPARATUS AND METHOD FOR DETERMINING A LIQUID LEVEL IN A STEAM DRUM

(75) Inventors: Paul Hatfield, Louisville, KY (US); Harold Kearney, Simpsonville, KY (US)

(73) Assignee: Vogt Power International, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/155,066

(22) Filed: Jun. 17, 2005

Related U.S. Application Data

(63) Continuation of application No. 10/959,550, filed on Oct. 6, 2004, now Pat. No. 6,932,028.

(51) Int. Cl.
*G01F 23/00* (2006.01)
(52) U.S. Cl. .................................. 73/290 R
(58) Field of Classification Search ............. 73/290 R; 122/504, 506, 508
See application file for complete search history.

(56) References Cited

U.S. PATENT DOCUMENTS

| | | | | |
|---|---|---|---|---|
| 4,527,714 A | * | 7/1985 | Bowman | 222/56 |
| 4,711,117 A | * | 12/1987 | Cosser | 73/1.73 |
| 4,765,945 A | * | 8/1988 | Walleser | 376/258 |
| 6,053,041 A | * | 4/2000 | Sinha | 73/290 V |
| 6,157,894 A | * | 12/2000 | Hess et al. | 702/54 |

* cited by examiner

*Primary Examiner*—Hezron Williams
*Assistant Examiner*—Rodney Frank
(74) *Attorney, Agent, or Firm*—Stites & Harbison, PLLC; David W. Nagle, Jr.

(57) ABSTRACT

An apparatus for determining a density-compensated liquid level in a vessel containing a mixture of liquid and vapors comprises a temperature sensor which produces a signal that is proportional to the temperature of the mixture; and a processing apparatus that includes one or more pressure sensors that allow for a measurement of an operating pressure and a differential pressure between the mixture in the vessel and a constant reference leg. The processing apparatus further includes an integral microprocessor for calculating the respective specific gravities of the liquid and vapor portions of the mixture based on the operating pressure, and then computing the density-compensated liquid level in the vessel based on such calculations of specific gravity and the differential pressure.

10 Claims, 4 Drawing Sheets

APPARATUS AND METHOD FOR DETERMINING A LIQUID LEVEL IN A STEAM DRUM

This application is a continuation of application Ser. No. 10/959,550, filed Oct. 6, 2004, now U.S. Pat. No. 6,932,028.

BACKGROUND OF THE INVENTION

The present invention relates to an apparatus and method for determining liquid level in a steam drum or similar vessel operating at or near saturated conditions, and, more particularly, an apparatus and method that allows for a more accurate reading of the liquid level in a steam drum or similar vessel by compensating for variances in operating pressures and temperatures.

The American Society of Mechanical Engineers ("ASME") has promulgated a Boiler Code, which, in pertinent part, states that "at least one gage glass shall be readily visible to the operator in the area where control actions are initiated. Alternately, two dependable indirect indications shall be provided, either by transmission of the gage glass image or by remote level indicators . . . " ASME Boiler Code, Section I, Part PG-60.1.1.

Since it is often difficult to have a gage glass in the immediate vicinity of the control room, the alternate option is typically preferred, wherein two indirect indications of liquid level in a steam drum or similar vessel are provided. In this regard, a master control system typically serves as the first indirect means of indication. The industry standard for power plants has been the use of a water column with conductivity probes as the second means of remote level indication ("RLI").

Using a water column and conductivity probes, however, does not always provide the desired measurement accuracy. Indeed, it is common that the water column and conductivity probe arrangement provides measurements that are in disagreement with the computerized master control system, since the probe method is only accurate for one set of operating conditions.

FIG. 1 is a schematic view of a standard prior art water column with conductivity probes. As shown, the water column 12 is secured to and in liquid communication with a steam drum 10. As the liquid level rises or falls in the steam drum 10, the liquid level simultaneously rises or falls in the water column 12. To transmit this liquid level in the water column 12 to a remote location (i.e., the control room), a series of conductivity probes 14 are inserted into the water column to sense the liquid level. A display unit 16 in the remote location has a series of light indicators, each of which correspond to a specific conductivity probe. Therefore, for each conductivity probe 14 that is in contact with liquid, a corresponding indicator of the display unit 16 is illuminated.

However, such a method of remote level indication is rife with error as a standard water column with conductivity probes is only accurate at a single predefined set of operating conditions. Specifically, the density of the liquid in the water column 12 is not always the same as that of the liquid in the steam drum 10, especially at elevated operating temperatures and pressures. In this regard, as shown in FIG. 1, the conductivity probes 14 are essentially switches that are installed at fixed points along the water column 12. Thus, to take into account density differences would require relocation of the conductivity probes 14 relative to the water column 12. To address this problem, some attempts have been made to provide conductivity probes that can be adjusted to account for density differences through a range of operating conditions. However, since an appropriate adjustment would be required each time the operating conditions are altered, such a solution has not proved satisfactory.

There is therefore a need for an apparatus and method for determining liquid level in a steam drum or similar vessel that overcomes the problems of the prior art, an apparatus and method that takes into account liquid density differences between a steam drum or similar vessel and a water column used for determining the level of liquid in the steam drum or similar vessel.

SUMMARY OF THE INVENTION

The present invention is an apparatus and method for determining liquid level in a steam drum or similar vessel, and, more particularly, an apparatus and method that allows for a more accurate reading of the liquid level in a steam drum or similar vessel by compensating for operating pressures and temperatures, which are often subject to rapid and continuous variations.

A steam drum or similar vessel operating at or near saturated conditions contains a mixture of liquid and vapor. In accordance with the present invention, the drum is provided with a temperature sensor which produces an electrical signal that is proportional to the temperature of the mixture, transmitting that signal to a processing apparatus, which is also referred to as a "multi-variable transmitter" herein. Then, at a lower tapping point, a line extends from and is in liquid communication with the drum, said line terminating at the multi-variable transmitter. At an upper tapping point, a second line extends from and is in liquid communication with the drum, said line terminating at a condensate pot. This condensate pot condenses steam from the vapor portion of the mixture to provide a constant reference leg for differential pressure measurement. A third line extends from and is in liquid communication with the condensate pot, said line terminating at the multi-variable transmitter.

The multi-variable transmitter includes one or more integral pressure sensors that allow for measurements of the pressure at the lower tapping point and in the condensate pot, which ultimately allows for a determination of the differential pressure between the drum and the constant reference leg. Furthermore, the multi-variable transmitter includes an integral microprocessor that calculates the specific gravity of the liquid and vapor portions of the mixture based on the measured operating pressure, thereby allowing for a computation of a density-compensated liquid level in the drum. A signal proportional to the computed liquid level is then preferably generated and transmitted from the multi-variable transmitter to a visual indicator.

DETAILED DESCRIPTION OF THE INVENTION

The present invention is an apparatus and method for determining liquid level in a steam drum or similar vessel (especially any vessel operating at or near saturated conditions), and, more particularly, an apparatus and method that allows for a more accurate reading of the liquid level in a steam drum or similar vessel by compensating for operating pressures and temperatures, which are often subject to rapid and continuous variations.

Figure 1:
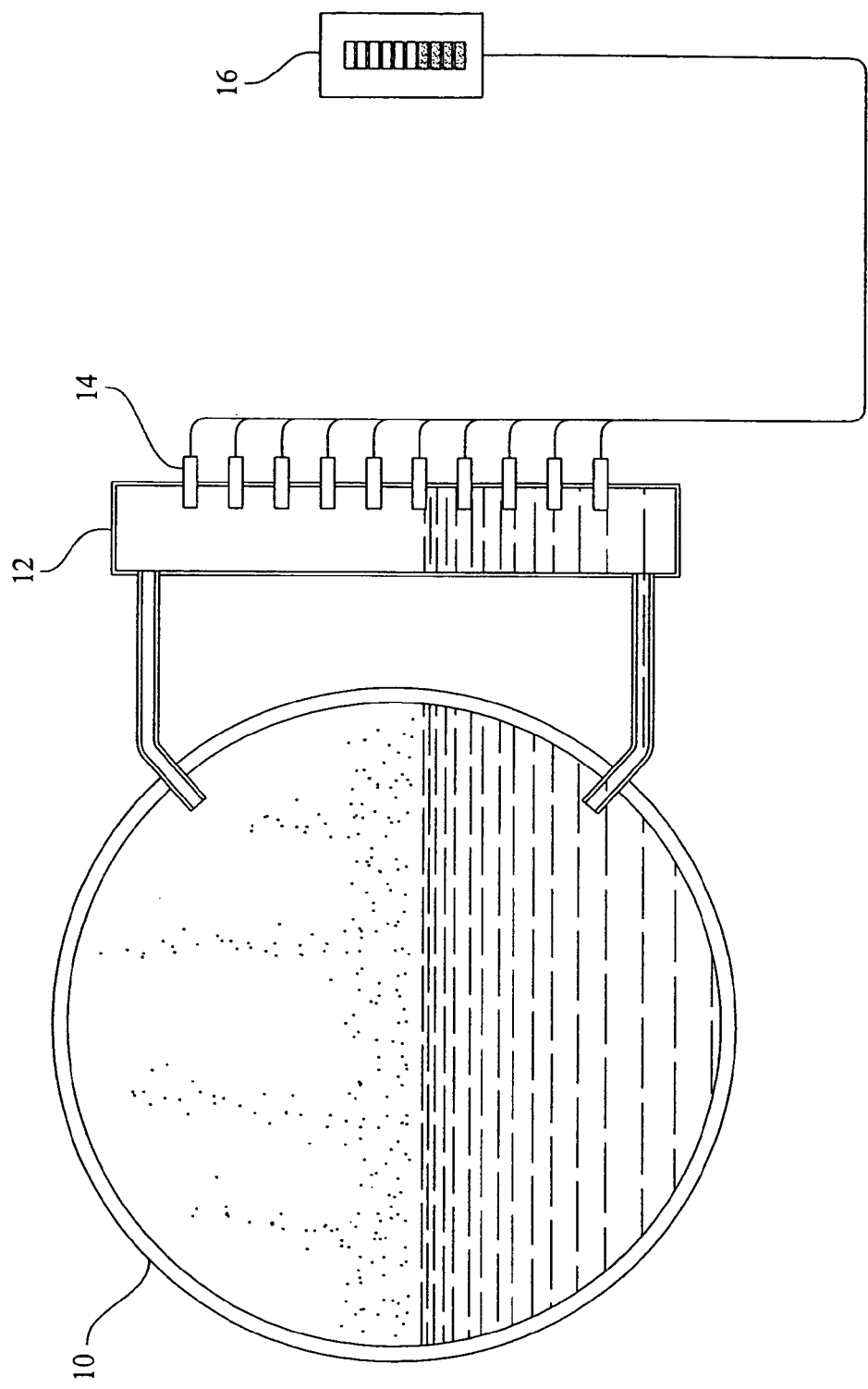
FIG. 1 is a schematic view of a standard prior art water column with conductivity probes, which is secured to and in liquid communication with a steam drum.
Figure 2:
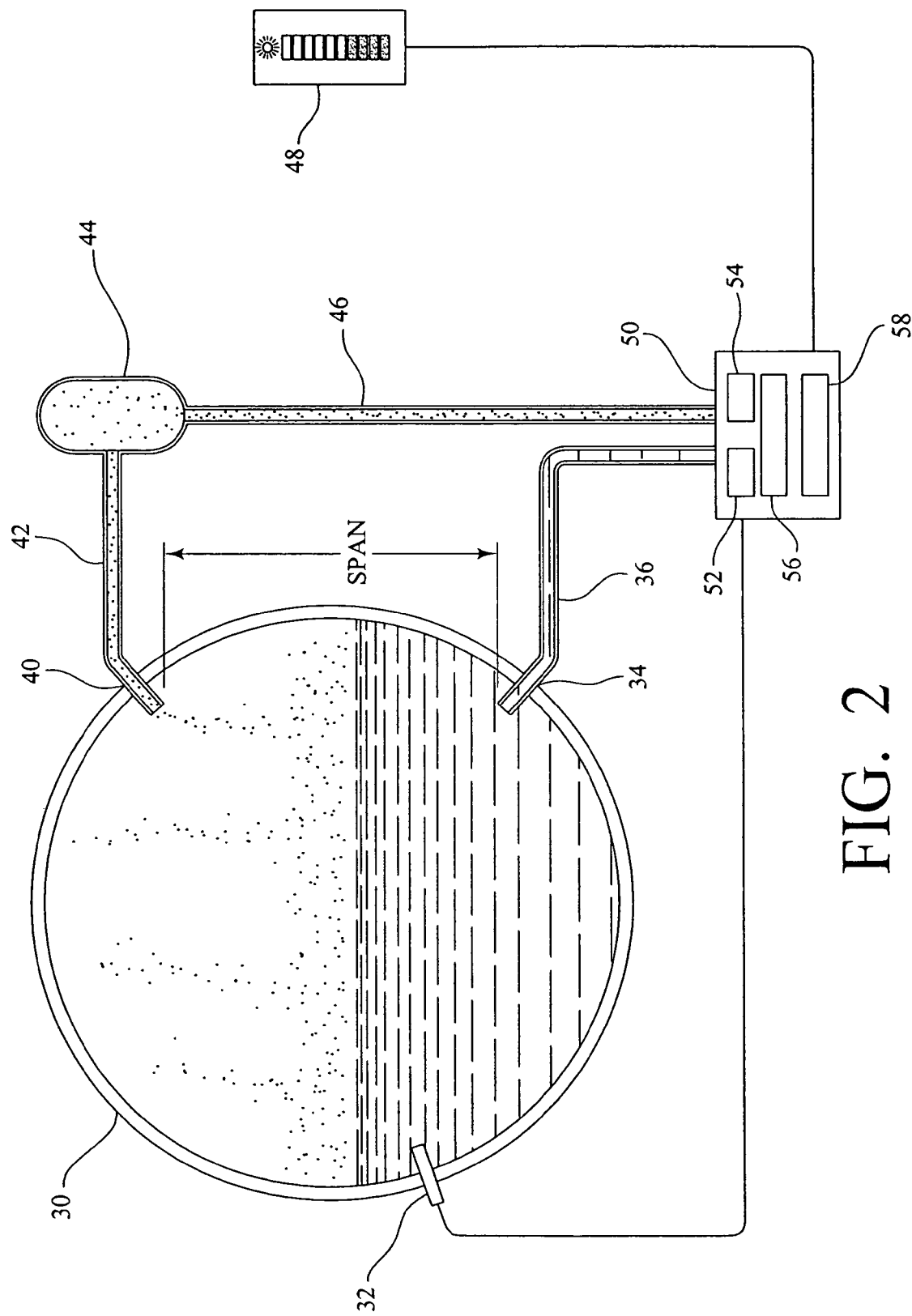
FIG. 2 is a schematic view of an exemplary apparatus made in accordance with the present invention, which is secured to and in liquid communication with a steam drum.

Referring now to FIG. 2, a steam drum 30 contains a mixture of liquid and vapor. As stated above, the objective is to obtain an accurate reading of the liquid level in the steam drum 30. Accordingly, the drum 30 is provided with a temperature sensor 32 which produces an electrical signal that is proportional to the temperature of the mixture, transmitting that signal to a processing apparatus 50, which is referred to as a "multi-variable transmitter" in the description that follows and the function of which is further explained below. Then, at a lower tapping point 34, a line 36 extends from and is in liquid communication with the drum 30, said line 36 terminating at the multi-variable transmitter 50. At an upper tapping point 40, a second line 42 extends from and is in liquid communication with the drum 30, said line 42 terminating at a condensate pot 44. This condensate pot 44 condenses steam from the vapor portion of the mixture to provide a constant reference leg for differential pressure measurement. A third line 46 extends from and is in liquid communication with the condensate pot 44, said line 46 terminating at the multi-variable transmitter 50.

The multi-variable transmitter 50 includes one or more integral pressure sensors 52, 54 that allow for a measurement of the pressure at the lower tapping point 34 (i.e., operating pressure) and in the condensate pot 44, which ultimately allows for a determination of the differential pressure between the drum 30 (at the lower tapping point 34) and the constant reference leg (i.e., in the condensate pot 44), as is described below. Various commercially available pressure sensors may be incorporated into the multi-variable transmitter 50, and the function of such pressure sensors is readily understood by one of ordinary skill in the art. Furthermore, the multi-variable transmitter 50 includes an integral microprocessor 56 that calculates the specific gravity of the liquid and vapor portions of the mixture as a function of the measured operating pressure, which then allows for a computation of a density-compensated liquid level in the drum 30. With benefit of the description that follows, the necessary programming of such a microprocessor can be readily accomplished by one of ordinary skill in the art.

Figure 3A:
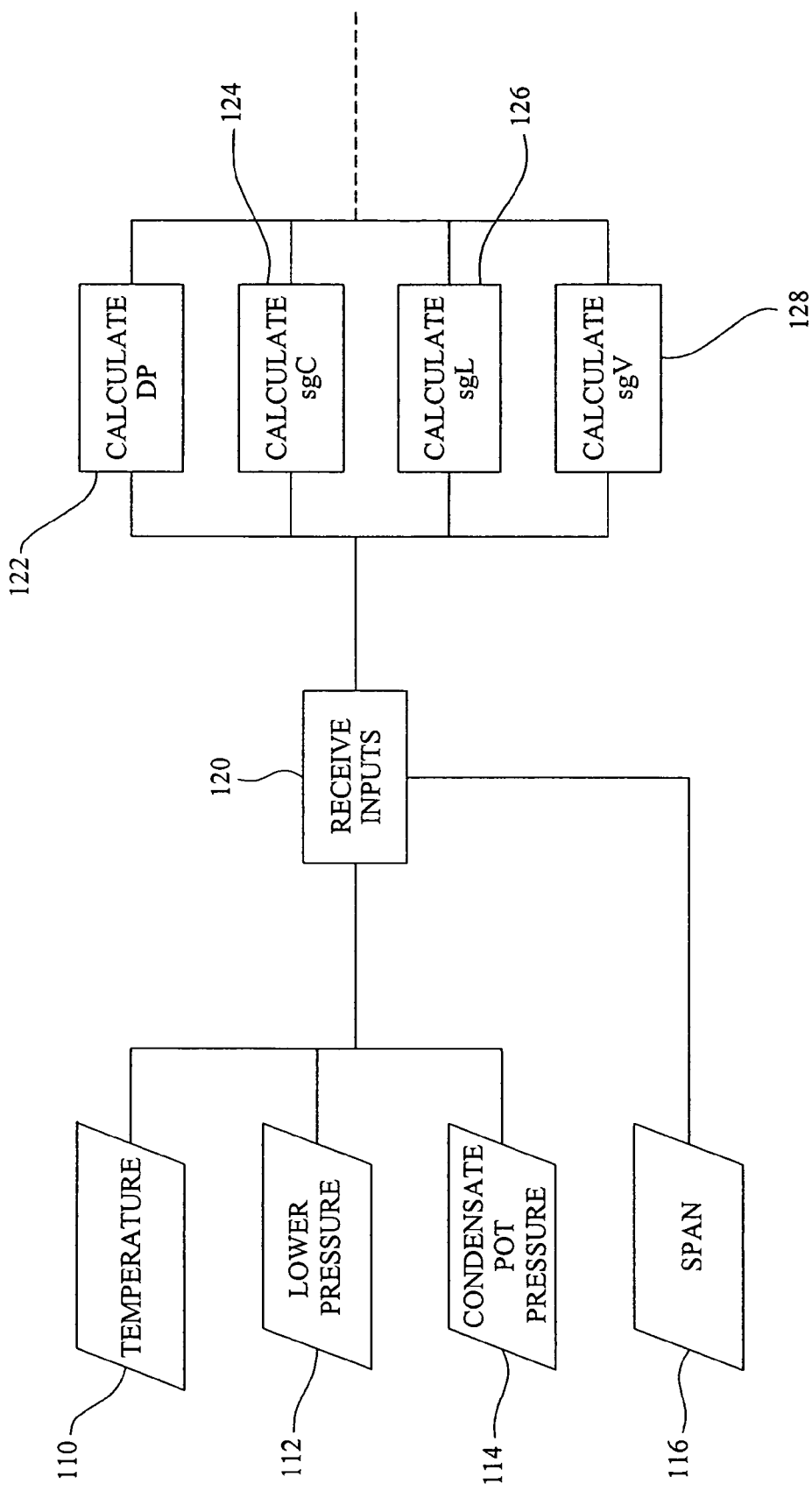
FIGS. 3A and 3B are flow charts illustrating the method steps in an exemplary implementation of the method of the present invention.
Figure 3B:
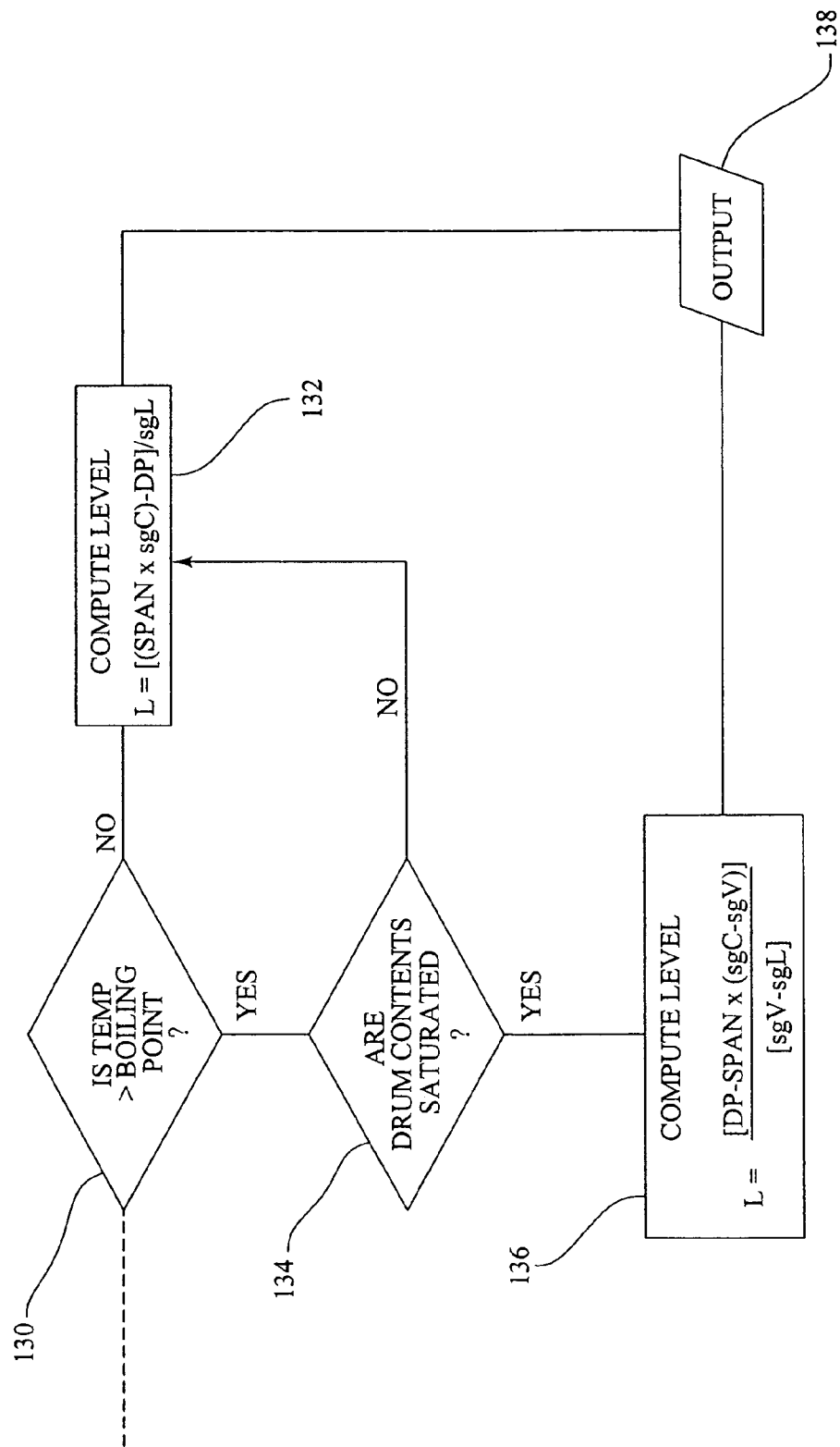

Referring now to the flow charts of FIGS. 3A and 3B, the multi-variable transmitter 50 receives as an input the electrical signal that is proportional to the temperature of the mixture, as indicated at input 110. Also, the multi-variable transmitter 50 is in fluid communication with the lower tapping point 34 of the drum 30 (as shown in FIG. 2), allowing the pressure at the lower tapping point 34 to be determined and used as an input for further computation, as indicated at input 112. Similarly, the multi-variable transmitter 50 is in fluid communication with the condensate pot 44 (as shown in FIG. 2), allowing the pressure in the condensate pot 44 to be determined and used as an input for further computation, as indicated at input 114. Accordingly, there are essentially three variable inputs.

Furthermore, the "Span" must be considered, which is defined as the vertical distance between the upper and lower tapping points 34, 40 on the drum 30, as shown in FIG. 2. This value must also be established and stored in memory associated with the above-described microprocessor 56 of the multi-variable transmitter 50 to enable the further computations.

After the various inputs have been received, as indicated by reference numeral 120, certain values are calculated, including: (1) the differential pressure between the drum 30 and the constant reference leg, DP, as indicated by block 122; (2) the specific gravity of the condensate in the reference leg, sgC, as indicated by block 124; (3) the specific gravity of the liquid in the drum 30, sgL, as calculated using the operating pressure measurement and indicated by block 126; and (4) the specific gravity of the vapor in the drum 30 and reference leg, sgV, as calculated using the operating pressure measurement and indicated by block 128.

With respect to the calculations of the respective specific gravities, it should be recognized and understood by one of ordinary skill in the art that such values can be readily determined through mathematical computations carried out by the microprocessor 56 of the multi-variable transmitter 50 (as described above) and/or through interpolation of standard steam tables.

Once these values have been calculated by the microprocessor 56 of the multi-variable transmitter 50, a determination is made as to whether the temperature of the mixture exceeds the boiling point of the liquid (e.g., 212° F. for water at atmospheric pressure), as indicated at decision 130. If the temperature measurement is less than the boiling point of the liquid, the density-compensated liquid level in the drum 30 is then computed, as indicated at block 132, as follows:

$$\text{Level} = [(\text{Span} * sgC) - DP]/sgL \quad (1)$$

Otherwise, if the temperature measurement is greater than the boiling point of the liquid, a determination is made as to whether the drum contents are in a saturated condition, as indicated at decision 134. Under most operating conditions, if the temperature measurement is greater than the boiling point of the liquid, it can be assumed that the drum contents are in a saturated condition, in which case this additional decision step is largely unnecessary. In any event, if the drum contents are not in a saturated condition, the density-compensated liquid level in the drum 30 is again computed as set forth in equation (1). If drum contents are in a saturated condition, the density-compensated liquid level in the drum 30 is computed, as indicated at block 136, as follows:

$$\text{Level} = [DP - \text{Span} * (sgC - sgV)]/[sgL - sgV] \quad (2)$$

A signal proportional to the compensated level measurement is then preferably generated, as indicated by output 138. Then, referring again to FIG. 2, this signal is communicated from a transmission module 58 of the multi-variable transmitter 50 to a bi-color display 48 or similar visual indicator. This transmission module 58 may simply communicate the signal to the bi-color display 48 through a wired connection, as illustrated in FIG. 2, or could include a radio frequency transceiver for wireless communication. In any event, the display 48 preferably provides a digital readout of the liquid level with reference to a standard or "normal water level." The display 48 may also provide a graphical depiction of the liquid level via a bar graph, and/or may initiate an alarm when the liquid level exceeds a predetermined limit. Lastly, the display 48 may allow for re-transmission of the signal to a secondary display or main control.

For purposes of example, assume that the steam drum 30 has a Span of 20 inches, with the Span again being defined as the vertical distance between the upper and lower tapping points 34, 40 on the drum 30. Furthermore, the steam drum 30 is operating a temperature of greater than 212° F. and at a pressure of 1700 psia, as determined by the measurement of the operating pressure in the constant reference leg by the multi-variable transmitter 50. Therefore, it is assumed that the drum contents are in a saturated condition. Finally, the differential pressure, DP, is measured at 10 inches of water by the pressure sensors 52, 54 of the multi-variable transmitter 50.

First, based on the operating pressure and the assumption that the drum contents are in a saturated condition, the respective specific gravities of the vapor (sgV) and the liquid (sgL) can be calculated, for example, through interpolation of standard steam tables.

$$sgV\ (1700\ psia) = 0.06828 \quad (3)$$

$$sgL\ (1700\ psia) = 0.65826 \quad (4)$$

Also, for most operating conditions, the specific gravity of the condensate (i.e., water), sgC, is assumed to be one:

$$sgC\ (1700\ psia) = 1.00 \quad (5)$$

With these values calculated, the density-compensated liquid level in the drum 30 is computed using equation (2) above:

$$\text{Level} = [10\ \text{inches} - 20\ \text{inches} * (1.00 - 0.06828)] / [0.06828 - 0.65826] \quad (6)$$

$$\text{Level} = [10\ \text{inches} - 20\ \text{inches} * (0.93172)] / [-0.58998] \quad (7)$$

$$\text{Level} = 14.635\ \text{inches} \quad (8)$$

As described above, a signal proportional to this compensated level measurement is then preferably generated and communicated to a bi-color display 48 or similar visual indicator.

One of ordinary skill in the art will recognize that additional configurations are possible without departing from the teachings of the present invention or the scope of the claims which follow. This detailed description, and particularly the specific details of the embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A multi-variable transmitter for determining a density-compensated liquid level in a vessel containing a mixture of liquid and/or vapor and communicating a signal representative of the liquid level to a remote monitoring location, comprising:
    one or more pressure sensors for measuring (a) an operating pressure, and (b) a differential pressure between the mixture in the vessel and a constant reference leg;
    an integral microprocessor for calculating the respective specific gravities of the liquid and vapor portions of the mixture based on the measured operating pressure, and then computing the density-compensated liquid level in the vessel based on such calculations of specific gravity and the measured differential pressure; and
    a transmission module for communicating the signal representative of the computed liquid level to the remote monitoring location.

2. The multi-variable transmitter as recited in claim 1, and further comprising a temperature sensor which produces a signal that is proportional to the temperature of the mixture, said integral microprocessor evaluating the signal to confirm whether the mixture is at or near a saturated condition.

3. The multi-variable transmitter as recited in claim 1, and further comprising an alarm that is initiated when the computed liquid level exceeds a predetermined limit.

4. The multi-variable transmitter as recited in claim 1, wherein said vessel includes an upper tapping point, a line extending from and in liquid communication with the vessel through the upper tapping point and terminating at a condensate pot, which condenses steam from the vapor portion of the mixture to provide the constant reference leg for measurement of the differential pressure.

5. The multi-variable transmitter as recited in claim 4, and further comprising an additional line extending from and in liquid communication with the condensate pot and terminating at the multi-variable transmitter.

6. The multi-variable transmitter as recited in claim 5, wherein said vessel also includes a lower tapping point, another line extending from and in liquid communication with the vessel through the lower tapping point and terminating at the multi-variable transmitter.

7. A method for determining a density-compensated liquid level in a vessel containing a mixture of liquid and/or vapor, comprising the steps of:
    providing a processing apparatus, including one or more pressure sensors and an integral microprocessor;
    measuring an operating pressure of the mixture using the processing apparatus;
    measuring a differential pressure between the mixture of liquid and vapor in the vessel and a constant reference leg using the processing apparatus;
    calculating the respective specific gravities of the liquid and vapor portions of the mixture based on the operating pressure using the microprocessor of the processing apparatus; and
    computing the density-compensated liquid level in the vessel using the microprocessor of the processing apparatus based on the calculations of specific gravity and the measured differential pressure.

8. The method as recited in claim 7, and further comprising the step of communicating a signal representative of the computed liquid level to a remote monitoring location.

9. A method for determining a density-compensated liquid level of drum contents at or near a saturated condition, comprising the steps of:
    providing a processing apparatus, including one or more pressure sensors and an integral microprocessor;
    measuring an operating pressure within the drum using the processing apparatus;
    measuring a differential pressure between the drum contents and a constant reference leg using the processing apparatus;
    confirming that the drum contents are at or near a saturated condition based on the measured operating pressure; and
    computing the density-compensated liquid level in the drum using the microprocessor of the processing apparatus based on calculations of specific gravity of the respective liquid and vapor portions of the drum contents and the measured differential pressure.

10. The method as recited in claim 9, and further comprising the step of communicating a signal representative of the computed liquid level to a remote monitoring location.

* * * * *